Dec. 14, 1926.
A. DAVIDSON
1,610,754
VEHICLE SUSPENSION
Filed April 9, 1921   2 Sheets-Sheet 2
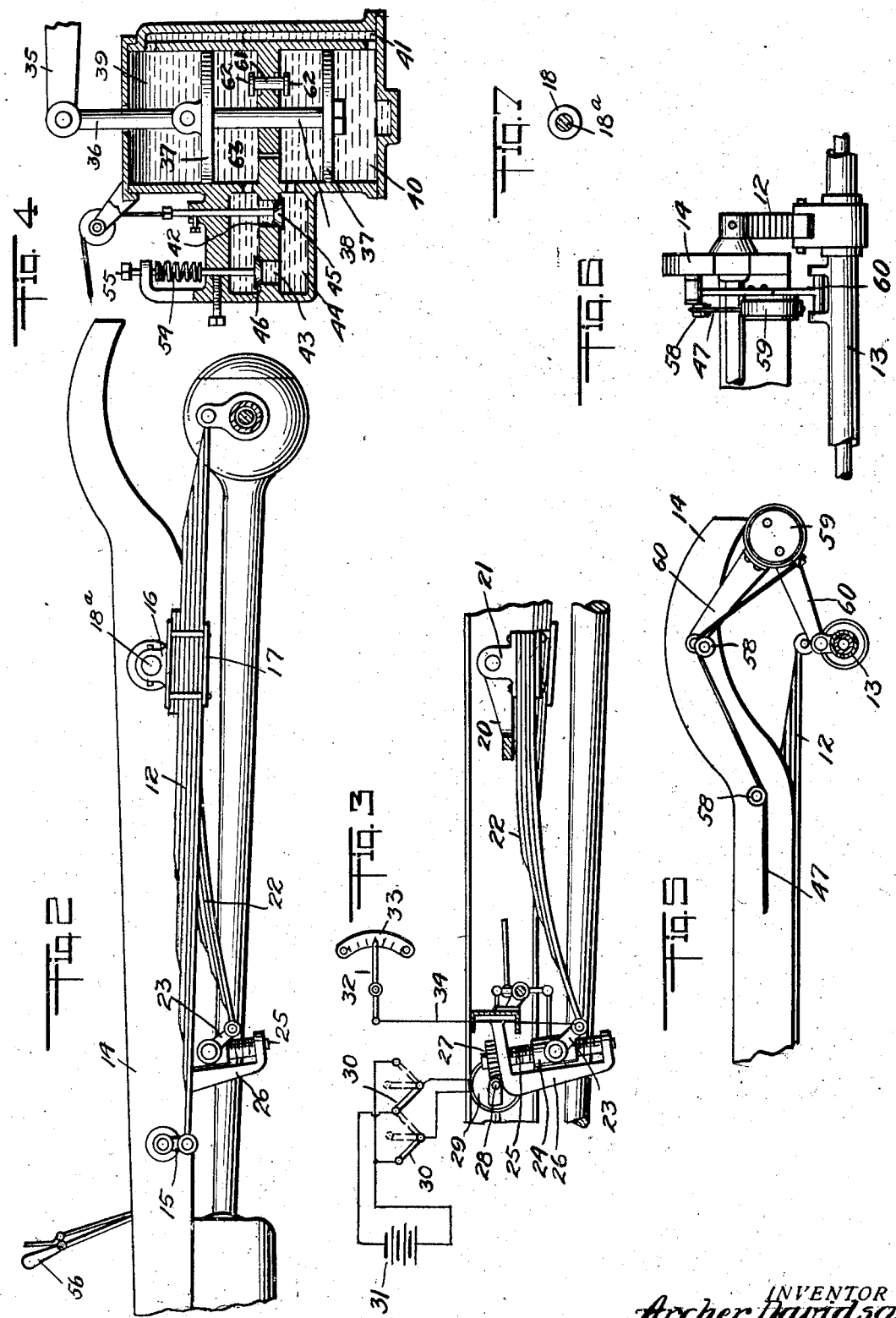
INVENTOR
Archer Davidson
BY
ATTORNEY
WITNESS
M. E. Lesin Patented Dec. 14, 1926.

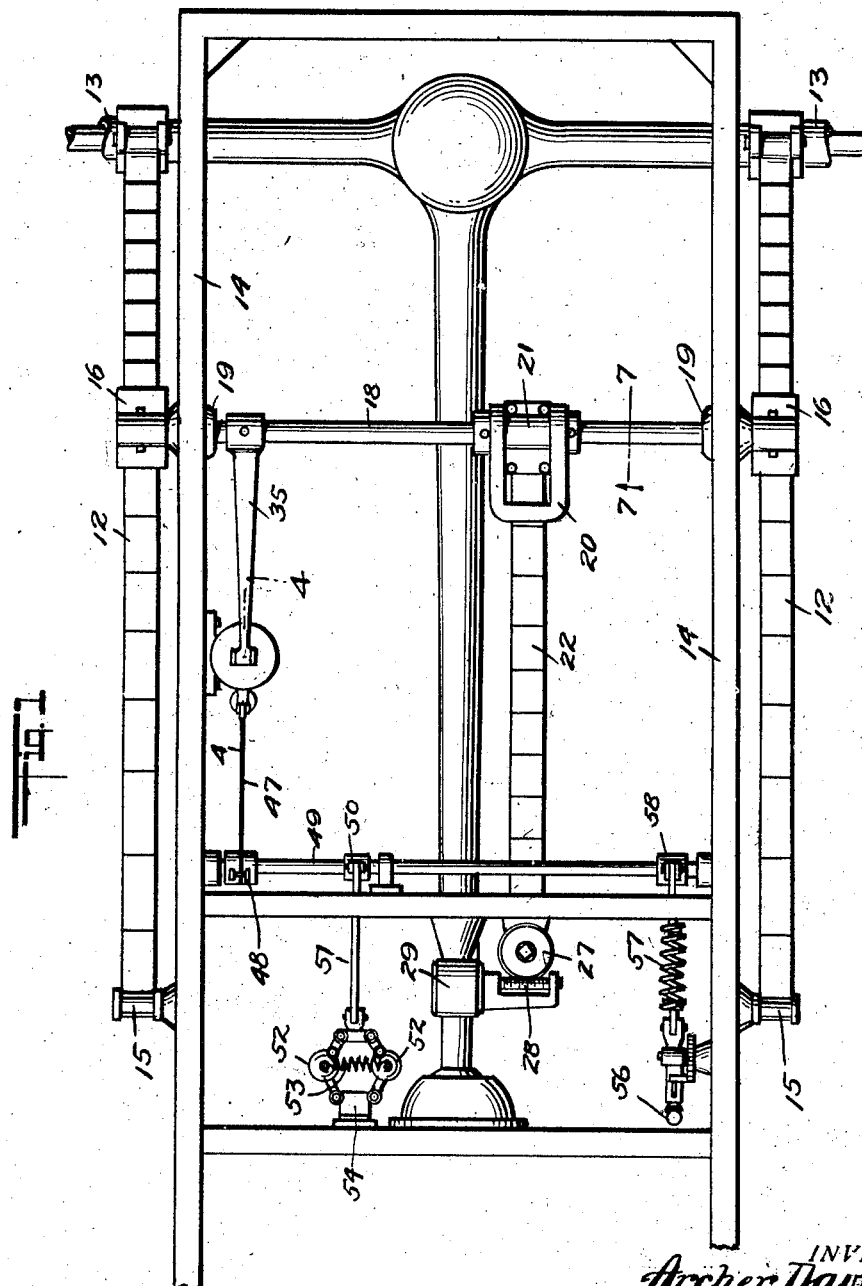

1,610,754

UNITED STATES PATENT OFFICE.

ARCHER DAVIDSON, OF BROOKLINE, MASSACHUSETTS.

VEHICLE SUSPENSION.

Application filed April 9, 1921. Serial No. 459,961.

Among the principal objects which the present invention has in view are: To provide an improved suspension of greater flexibility than has heretofore usually been employed in a vehicle; to vary the elasticity of the suspension of a vehicle in correspondence with service conditions; to approximately maintain the normal relation of the body and running gear of the vehicle by varying the elasticity of the suspension; to provide auxiliary retarding means to slow the movement or modify the elasticity of the suspension, absorb shocks, and adapt the suspension to service conditions; to vary the retarding means of the suspension in correspondence with the speed of travel of the vehicle; to provide power and manually operated means at will to vary the flexibility of the suspension; to provide co-operative power and manually operated means to vary the retarding means of the suspension, with the vehicle in motion; to prevent excessive side sway of the body of the vehicle employing the suspension; and to simplify the means for carrying the above stated objects into effect.

*Drawings:*

Figure 1 is a plan view of a rear portion of a vehicle chassis and running gear therefor, and a suspension mechanism operatively connecting the same, constructed and arranged in accordance with the present invention;

Figure 2 is a vertical side view of the same;

Figure 3 is a detail view showing a fragment of the side bars of the chassis, riding spring, bar thereof, and an axiliary spring for varying the spring carrying power of the vehicle;

Figure 4 is a detail view on enlarged scale in vertical section of a dash pot and controls therefor, operatively connected with the carrying springs to retard or modify the flexibility thereof, the section being taken as on the line 4—4 in Figure 1;

Figure 5 is a side view of a modified form of suspension, constructed and arranged in accordance with the present invention;

Figure 6 is a rear view thereof;

Figure 7 is a cross section of a modified spring connecting member and an axiliary supporting bar therefor, the section being taken as on the line 7—7 in Figure 1.

Heretofore, vehicle suspensions wherein carrying springs of maximum flexibility have been employed to provide an easy riding vehicle, the springs have been excessively depressed by the loading of the vehicle and have allowed the vehicle body to swing or sway in service in a manner disagreeable to the passengers and detrimental to the vehicle. Furthermore, however flexible the springs employed, they have been of a flexibility to provide maximum riding comfort with the vehicle fully loaded resulting in the suspension being not sufficiently flexible to give maximum riding comfort for what is termed light load conditions. An ideal condition that has been sought has been to provide a suspension so that it can be arranged for maximum possible flexibility with various loads carried by the vehicle, that will support various loads without excessive displacement of the vehicle body, and will provide maximum flexibility without permitting objectionable service swing or side sway of the vehicle body. In the present invention elastic auxiliary devices are employed to vary the flexibility of the suspension in correspondence with the service load of the vehicle and which co-operatively approximately maintain the normal relation of the body and running gear of the vehicle, and torsion devices operatively connecting together the various elastic means of the suspension are employed to prevent disagreeable service swing or side sway of the vehicle body.

It has also been ascertained that a vehicle travelling at a high rate of speed requires a suspension of different elasticity than one travelling at a slow rate. Heretofore, the suspension on so-called high speed vehicles have been of such elasticity as to be hard riding at slow speeds. Or, if the suspension be sufficiently flexible for comfort at slow speeds it has not been suitable for high speeds. Various types of shock absorbers or retarding mechanisms have been employed to overcome these difficulties by retarding or modifying the elasticity of the suspension, but they have not heretofore been readily adjustable with the vehicle in motion, nor have they been arranged to automatically provide greater or less retarding effect on the suspension in correspondence with the speed of the vehicle. Furthermore, the employment of some types of those means has resulted in a disagreeable swing or side-sway of the vehicle body. In the present invention auxiliary retarding mechanisms are employed which are varied with the vehicle in motion to retard or modify the elasticity of the suspension and absorb road shocks.

In the present invention the flexibility of the suspension is preferably adapted to elastically sustain the various loads carried thereby. With the suspension thus sustaining the load the retarding or modifying means of the suspension are varied to provide greater or less flexibility and adapt the suspension to service conditions.

As seen in the drawings I here employ main carrying springs 12 of the cantilever type, being connected to the vehicle axle 13 in an improved manner, and to the body of the chassis 14 by swinging shackles 15 and saddle 16 and clip plate 17 to which it is bolted. The body of the spring 12 is carried between the plate 17 and the saddle 16. The saddle 16 at each side of the vehicle is rigidly connected to a cross or jack shaft 18, which is suitably mounted by ball or other friction reducing bearings in the housings 19 in the side bars of the chassis 14. By connecting the saddle 16 and the spring 12 held thereby to the shaft 18 which is held in place by the bearings 19 on the chassis of the vehicle, excessive swing or sway of the body is eliminated.

As is usual in springs of the type referred to, the springs rock on their center bearings, pivotal connections being provided to that end. In the present invention the shaft 18 rocks in correspondence with the flexure of the said springs. When desirable, a torsional flexibility being permitted in the shaft 18 to admit of a small amount of independent movement of the two springs 12. When the shaft 18 is made torsionally flexible it is desirable that it should be stiffened by the auxiliary supporting bar 18ª, as best seen in Figure 7 of the drawings.

Rigidly connected with the shaft 18 is a bracket yoke 20. The yoke 20 straddles and holds in line a saddle 21, to which is rigidly bolted the butt end of an auxiliary cantilever spring 22. As seen best in Figure 3 of the drawings, the flexible end of the spring 22 is operatively connected with the swinging shackle 23 mounted on a nut 24. The nut 24 is suspended on a jack screw 25, which is mounted in bearings on a bracket 26, and has at the upper end a worm wheel 27, the teeth whereof engage the screw 28 on the armature shaft of an electric motor 29. The saddle 21 freely rotates on the shaft 18, the purpose being to allow for varying the relation between the spring 22 and the bracket 20, which is rigid with and extended horizontally from the shaft 18. When the nut 24 is lowered, the flexible end of the spring 22 is depressed, and the spring 22 is moved out of engagement with the bracket 20. Or, if not moved out of engagement, the pressure thereof upon the said bracket is lessened.

If the nut 24 is moved upward, the spring 22 is brought into contact with the bracket 20, and the tension of the auxiliary spring 22 is increased as the end thereof is raised by the nut 24 and the pressure of the spring 22 on the yoke 20 is increased. It is obvious that as the force of the spring 22 is exerted upward on the bracket 20, the resistance to the rocking of the shaft 18 is increased. As here arranged, it is seen that the springs 12 are more flexible forward of the jack shaft 18 than between the shaft 18 and the axle of the running gear. However flexible the springs 12 are forward of the shaft 18, it is seen a deflection, or any activity, of the springs 12 causes a rocking of the shaft 18. Therefore, if the rocking of the shaft 18 be resisted, and the resistance varied, the activity of the suspension is varied.

By raising the spring 22, the strength of the spring 22 is employed to flexibly resist the rocking of the shaft 18, which is equivalent to adding the strength of the spring 22 to the strength of that portion of the springs 12 forward of the shaft 18, thereby increasing the strength of the suspension. It is well known that increasing the strength of a suspension decreases its flexibility, and that decreasing the strength of a suspension increases its flexibility. Therefore, by raising or lowering the spring 22 the flexibility of the suspension is varied to most desirably sustain the various loads carried thereby, and consequently the maximum riding comfort may be obtained under various service conditions.

It is obvious, that if loading a vehicle body causes a flexure of the carrying springs and a consequent lowering of the vehicle body, that with the springs flexed and sustaining the load, that if the flexed springs be elevated the loaded vehicle body will be raised and may be restored to its original elevation. Hence by varying the spring 22 the normal elevation of the vehicle body and running gear may be maintained approximately constant.

The motor 29 may be operated by any suitable means. A double throw switch 30 shown in Figure 3 of the drawings may be manually operated to reverse the current delivered by the batteries 31 to the motor 29, and thereby reverse the rotation of the screws 28 and 25 and the direction of travel of the nut 24.

Any suitable indicator, such as the pointer 32, and the calibrated quadrant 33, may be employed to indicate the position of the spring 22, the said pointer 32 being connected by means of a rod 34 with the shackle 23 in the flexible end of the said spring 22.

By operating the screw 25 manually, the spring 22 may at will be brought into service or its effect may be varied.

To provide an auxiliary retarding mechanism to slow the movement of the springs of the suspension and absorb road shock, the shaft 18 has an arm 35, which, as shown best in Figure 4 of the drawings, is connected by means of a rod 36 with a spool piston 37. The disks of the piston 37 are rigidly united by a bar 38. The chambers 39 and 40 constitute a dash pot construction and are connected by a channel 41 for the transfer of liquid from one of said chambers to the other. The transfer is augmented by employing the ports 42 and 43 in a central partition of a lateral chamber 44. The ports 42 and 43 are furnished with valves 45 and 46 respectively, the said ports connecting with outlets for liquid flowing from the chamber 39 to the chamber 40, and reversely from the chamber 40 to the chamber 39. It will be seen that normally the end of the arm 35 is raised and lowered in unison with the rocking of the shaft 18. It is also obvious that the speed of the rise and fall of the said arm, and consequently the speed of rotation of the said shaft, is dependent upon the passage of liquid through the ports 42 and 43.

The port 42 is controlled by the valve 45 and this is connected by means of a pull cord 47 with the arm 48 on the rocking shaft 49. The rocking shaft 49 is connected by means of a second arm 50 and a rod 51 with a flying ball governor 52. The balls 52 are normally contracted by a spring 53, the shaft 54 on which the said balls are mounted being rotatably connected with the carrying wheels of the vehicle, a suitable transmission being provided therefor.

From the foregoing it will be seen that as the speed of the vehicle increases the balls 52 expand and draw upon the rod 51 to rock the shaft 49 and the arm 48 mounted thereon, pulling the cord 47 to lift the valve 45 in closer relation to the port 42. As the opening in the port 42 is diminished the resistance to the flow of the liquid from the chamber 39 to the chamber 40 is increased and the action of the arm 35 and shaft 18 is retarded.

The valve 46 which controls the opening of the port 43 is seated by a spring 54 the tension whereof is manually varied by a pressure nut 55. The flow of the liquid through the port 43 is in correspondence with the return or back movement of the arm 35. The tension of the spring 54 may be varied from time to time and allowed to remain while the operation of the valve 45 is variable in accordance with and in response to the speed of the vehicle.

The automatic operation above described is assisted or varied by means of the hand lever 56. The lever 56 is connected by means of a spring 57 with an arm 58, set up from the shaft 49. When the driver of the vehicle wishes to increase the resistance of the shock absorber independent of the automatic action provided by the governor 52, he pulls the lever 56 and thereby exerts a pull of the spring 57 on the arm 58 to rock the shaft 49 and the arm 48 connected therewith, with the same result as described with regard to the rocking of the shaft 49 by means of the balls 52.

When it is desired to permit a limited free motion of the springs of the suspension a free moving cylinder 61 with enlarged ends 62 is employed. The cylinder 61 freely slides up and down as limited by the ends 62. This free action of the cylinder 61 permits a limited free motion of the piston 37, and consequently the springs of the suspension, with the valves 45 and 46 forcibly seated. To permit a further free motion of the springs of the suspension and to merge the free motion provided by 61 into a stronger resistance offered by the valves 45 and 46 to the interflow of fluid between chambers 39 and 40, the passage 63 is provided.

From the foregoing it will be seen that when thus provided a vehicle may be furnished with very flexible springs, the carrying power of which may be assisted or augmented by means of an auxiliary spring, which may be brought into action at will, and also that the flexibility of the springs, including the auxiliary spring when employed, may be modified and road shocks absorbed by an auxiliary retarding or modifying mechanism which may be varied manually at will or in correspondence with the speed of the vehicle.

It will be understood that the auxiliary retarding or modifying mechanism and the auxiliary spring, either being used separately or in combination with the other, retard or modify the flexibility of the suspension as a whole by modifying the normal flexibility of those portions of the suspension springs 12 forward of the jack shaft 18, while leaving the normal flexibility of those portions of the suspension springs 12 between the shaft 18 and the axle 13 substantially unchanged. Also, since the springs 12 are operatively connected together by the cross shaft 18, those portions of the springs forward of the shaft 18 are flexed simultaneously, and consequently the flexibility of these forward portions of the springs 12, and also of the auxiliary spring 22 when employed, can have no tendency to permit objectionable swing or side-sway of the body of the vehicle. On the other hand, the combined resistance of those portions of the suspension forward of the shaft 18, including that of the auxiliary retarding means, tends to resist such side-sway. As a result of these facts it will be understood that the carrying springs may be made much more flexible than those heretofore commonly employed without permitting excessive side-sway or swing, and that the flexibility of those portions of the springs 12 between the shaft 18 and the axle 13 will largely determine the extent of the side-swing of the body.

In Figures 5 and 6 of the drawings a modified form of the invention is shown, the modification consisting in that the pull cord 47 is carried over idler pulleys 58 to a friction operating shock absorber 59 of a well known and suitable type. As shown in the drawings, the connecting arms 60 of the absorber 59 are connected with the rear end of the side bars of the chassis 14, and the rear axle 13 of the vehicle. It will be understood that the mechanism employing the hand lever 56 and the flying balls 52 operatively connected with the running gear of the vehicle may be employed for effecting or altering the operation of any of the well known types of shock absorbers, when used in connection with either cantilever or other types of carrying springs or suspension.

Claims:

1. In a vehicle, a vehicle suspension comprising a plurality of metal load carrying suspension members, and means for varying the number of said members in service; a power supply carried by said vehicle; and means operable by said power supply and operatively connected to said means for varying the number of said members in service.

2. A vehicle suspension comprising a plurality of metal resilient load carrying suspension members, and means for varying the number of said members in service; and means operatively connected with certain of said members and operable to dispose the same actively and inactively.

3. For spring supporting a vehicle frame from an axle thereof, bearings of said frame, a cross shaft carried in said bearings, light load cantilever springs operatively connected at one end to said axle and operatively connected at their other ends to said vehicle frame, and said springs between said ends being connected to said cross shaft, said shaft being rocked by said springs; auxiliary resilient load carrying means, normally inactive for light loads; means operable by said shaft to engage said auxiliary means for service activity; and means operatively disposing said auxiliary resilient means in active relation to said shaft for heavy loads carried by said vehicle.

4. For spring supporting a vehicle frame from an axle thereof, bearings of said frame, a cross shaft carried in said bearings, cantilever springs operatively connected at one end to said axle and operatively connected at their other ends to said vehicle frame, and said springs between said ends being connected to said cross shaft, said shaft being rocked by said springs; yielding non-elastic means connected to said shaft to resist the rocking of said shaft to augment the strength of said springs.

5. For spring supporting a vehicle frame from an axle thereof, bearings of said frame, a cross shaft carried in said bearings, cantilever springs operatively connected at one end to said axle and operatively connected at their other ends to said vehicle frame, and said springs between said ends being connected to said cross shaft, said shaft being rocked by said springs; yielding non-elastic means connected to said shaft to resist the rocking of said shaft to augment the strength of said springs and to slow the rebound of said springs.

6. For a spring supporting a vehicle frame from an axle thereof, bearings of said frame, a cross shaft carried in said bearings, cantilever springs operatively connected at one end to said axle and operatively connected at their other ends to said vehicle frame, and said springs between said ends being connected to said cross shaft, said shaft being rocked by said springs, yielding non-elastic means connected to said shaft to resist the rocking of said shaft to augment the strength of said springs and to slow the rebound of said springs; and means to, at will, vary said yielding means to vary the activity of said springs.

7. For a spring supporting a vehicle frame from an axle thereof, bearings of said frame, a cross shaft carried in said bearings, light load cantilever springs operatively connected at one end to said axle and operatively connected at their other ends to said vehicle frame, and said springs being connected to said cross shaft between the ends of said springs, said shaft being rocked by said springs, yielding non-elastic means connected to said shaft to augment the strength of said springs and to slow the rebound of said springs; auxiliary resilient load carrying members; and means operatively disposing said auxiliary members in active relation with said light load springs under loaded conditions thereof.

8. For spring supporting a vehicle frame from an axle thereof, bearings of said frame, a cross shaft carried in said bearings, cantilever springs operatively connected at one end to said axle and operatively connected at their other ends to said vehicle frame, and said springs between said ends being connected to said cross shaft, said shaft being rocked by said springs; an arm connected to said shaft to be rocked therewith, the end of said arm being operatively connected to a piston; a cylinder connected to said frame, said piston to move in said cylinder; and means in said cylinder to yieldingly resist the movement of said piston to retard the rocking of said cross shaft.

9. For spring supporting a vehicle frame from an axle thereof, bearings of said frame, a cross shaft carried in said bearings, springs operatively connected to said axle and said shaft, said shaft to be flexibly rocked by said springs by the activity of said axle; springs operatively connected to said vehicle frame and said cross shaft to flexibly resist the rocking of said shaft; and non-elastic yielding means connected to said shaft and to said vehicle frame to retard the activity of said cross shaft.

10. For spring supporting a vehicle frame from an axle thereof, bearings of said frame, a cross shaft carried in said bearings, springs operatively connected to said axle and said shaft, said shaft to be flexibly rocked by said springs by the activity of said axle; springs operatively connected to said vehicle frame and said cross shaft to flexibly resist the rocking of said shaft; non-elastic variable yielding means connected to said shaft and to said frame to retard the activity of said cross shaft; and means to at will, vary said non-elastic variable yielding means.

11. In a power driven vehicle; springs supporting the vehicle frame from an axle thereof, bearings of said frame, a cross shaft carried in said bearings, said shaft to be flexibly rocked by said springs by the activity of said axle; springs operatively connected to said vehicle frame and said cross shaft to flexibly resist the rocking of said shaft, non-elastic variable yielding means connected to said shaft and to said frame; means to vary said non-elastic variable yielding means; and means operatively connected to said non-elastic variable yielding means to vary said yielding means approximately in correspondence with the speed of said vehicle.

12. In a vehicle, a vehicle suspension comprising, a plurality of elastic means and constant yielding means operatively disposed to support the frame of said vehicle from an axle thereof, said elastic means and said constant yielding means being operatively connected together by a rockable cross shaft rockably mounted in bearings of the frame of said vehicle.

13. In a vehicle, a vehicle suspension comprising, a plurality of elastic means and constant yielding means operatively disposed to support the frame of said vehicle from an axle thereof, said elastic means and said slowing means being operatively connected together by a rockable cross shaft rockably mounted in bearings of the frame of said vehicle; and means to vary the relations between said suspension and said vehicle.

14. In a vehicle, a vehicle suspension comprising, a rockable cross shaft rockably mounted in bearings of the frame of said vehicle, elastic means operatively connected to said cross shaft and to an axle of said vehicle, elastic means operatively connected to said cross shaft and the frame of said vehicle; and constant yielding means disposed to slow said elastic means operatively connected to said cross shaft and said vehicle frame.

15. In a vehicle, a suspension comprising a cantilever spring disposed between the body and running gear of said vehicle, one end of said spring being operatively connected to the body of said vehicle, the other end of said spring being operatively connected to the running gear of said vehicle, and the intermediate point of support of said spring being operatively connected to the body of said vehicle, said intermediate point of support being rocked by the activity of said spring; means operatively connected to said intermediate point of said spring and to said frame to check the activity of said spring and absorb shocks.

16. In a vehicle, a vehicle suspension comprising, a rockable cross shaft rockably mounted in the frame of said vehicle, said shaft being mounted crosswise to said frame; elastic means operatively connected to said cross shaft and to the axle of said vehicle, said cross shaft being rocked by said elastic means connected to said cross shaft and said axle; elastic means operatively connected to said cross shaft and the frame of said vehicle to resist the rocking of said cross shaft; and variable auxiliary means disposed to modify the normal elastic activity of said suspension by modifying the normal elasticity of said elastic means connected to said cross shaft and said vehicle frame while permitting a normal elastic activity of said elastic means connected to said cross shaft and said axle of said vehicle.

17. In a vehicle, a vehicle suspension comprising a rockable cross shaft rockably mounted in the frame of said vehicle, said shaft being mounted crosswise to said frame; elastic means operatively connected to said cross shaft and to an axle of said vehicle, said cross shaft being rocked by said elastic means connected to said cross shaft and said axle; elastic means operatively connected to said cross shaft and the frame of said vehicle to resist the rocking of said cross shaft; and auxiliary means operatively connected to said cross shaft and said vehicle frame to modify the normal elastic relations between said suspension and said vehicle.

18. In a vehicle, a vehicle suspension comprising, a rockable cross shaft rockably mounted in the frame of said vehicle, said shaft being mounted crosswise to said frame; elastic means operatively connected to said cross shaft and to an axle of said vehicle, said cross shaft being rocked by said elastic means connected to said cross shaft and said axle; elastic means operatively connected to said cross shaft and the frame of said vehicle to resist the rocking of said cross shaft; and variable auxiliary means operatively connected to said cross shaft and to said vehicle frame to vary the relations between said suspension and said vehicle.

19. A vehicle suspension comprising in combination, a vehicle frame, a cross shaft rotatably mounted in said frame, an axle, elastic members operatively connecting said cross shaft and said axle and adapted to rock said cross shaft when said axle is moved relatively thereto, means connected to said cross shaft and to said frame for resisting the rocking of said cross shaft, and means for varying the resistance offered by said means.

20. A vehicle suspension comprising in combination, a vehicle frame, a cross shaft rotatably mounted in said frame, an axle, elastic members operatively connecting said cross shaft and said axle and adapted to rock said cross shaft when said axle is moved relatively thereto, means connected to said cross shaft and to said frame for resisting the rocking of said cross shaft, and means for varying the resistance offered by said means, said last-mentioned means being adapted to be manually controlled at a point remote therefrom.

21. In a vehicle including a frame and an axle, a spring suspension for supporting said frame from said axle comprising in combination, bearings on said frame, a cross shaft rotatably mounted in said bearings, cantilever springs operatively connected at one end to said axle and at the other end to said frame, said springs being connected to said cross shaft between their ends and adapted to rock said cross shaft when said axle is moved relatively thereto, auxiliary means operatively connected to said cross shaft and said frame for resisting the rocking of said cross shaft, and means for varying said auxiliary means.

22. In a vehicle including a frame and an axle, a spring suspension for supporting said frame from said axle comprising in combination, bearings on said frame, a cross shaft rotatably mounted in said bearings, cantilever springs operatively connected at one end to said axle and at the other end to said frame, said springs being connected to said cross shaft between their ends and adapted to rock said cross shaft when said axle is moved relatively thereto, auxiliary means operatively connected to said cross shaft and said frame for resisting the rocking of said cross shaft, and means for varying said auxiliary means, said last-mentioned means being adapted to be manually controlled at a point remote therefrom.

ARCHER DAVIDSON.